(No Model.)

A. W. R. BERR.
VALVE.

No. 592,187. Patented Oct. 19, 1897.

Witnesses,
J. H. Nonse
G. F. Ascheck

Inventor,
August W. R. Berr
By Dewey & Co.
Attys

United States Patent Office.

AUGUST W. R. BERR, OF SAN JOSÉ, CALIFORNIA.

VALVE.

SPECIFICATION forming part of Letters Patent No. 592,187, dated October 19, 1897.

Application filed September 9, 1896. Serial No. 605,237. (No model.)

*To all whom it may concern:*

Be it known that I, AUGUST W. R. BERR, a citizen of the United States, residing at San José, county of Santa Clara, State of California, have invented an Improvement in Valves; and I hereby declare the following to be a full, clear, and exact description of the same.

My invention relates to a valve which is adapted to control the passage of any medium under pressure.

It consists of the parts and the constructions and combinations of parts which I shall hereinafter describe and claim.

Figure 1:
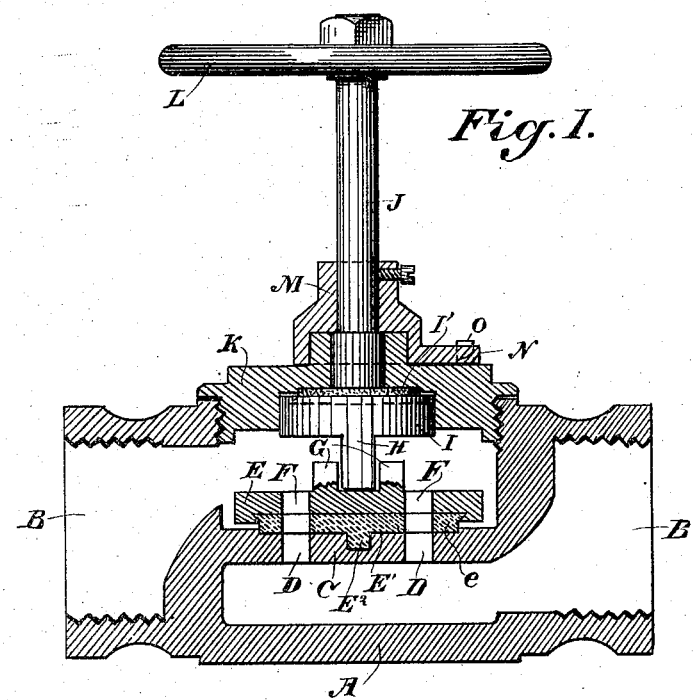
Figure 2:
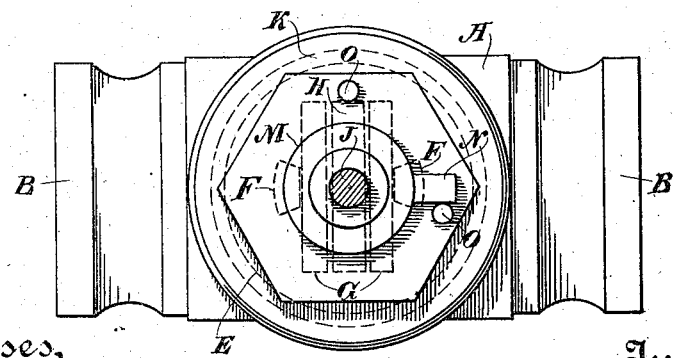

Figure 1 is a longitudinal section through the valve. Fig. 2 is a top view of the same.

A is the valve-case, which is cylindrical in form, and has upon opposite sides the extensions or couplings B, one of which connects with the inlet and the other with the exit pipe or passage. Within this valve-case is a diaphragm C, and the inlet-passage opens on one side of this diaphragm, and the outlet-passage upon the other. Holes D are made through the diaphragm to connect the two passages, and one side of the diaphragm forms a seat upon which the valve E is fitted. This valve is in the form of a circular disk, and has holes F made through it which when the valve is turned to stand in one position will coincide with the holes in the seat, and when turned to another position will cut off communication through these holes.

In order to make a closely-fitting seat at all times, I have chambered out the face of the valve E, and this chamber is filled with an antifriction metal which is cast therein, and is afterward turned and faced off to properly fit the seat. Whenever this metal is cut or worn, it may easily be melted out and a new face applied. This face E' does not extend quite to the periphery of the larger disk E, and there is a space all around that disk which will allow the steam or other medium to pass in beneath it and around the portion E', so that it has a certain pressure upon the lower side of the disk E, and thus partially balances the valve, and prevents too great a friction in turning it under high pressure.

Upon the side of the disk E opposite from the face are two parallel lugs or bars G, separated a short distance, and these lugs are engaged by a corresponding key H, which projects from a disk I, fixed upon the valve-stem J. This stem passes through the screw-cap K, which is fitted to close the end of the valve-chamber opposite the diaphragm. The screw-cap has a chamber formed in it with a circular countersunk depression and the disk I has a face of antifriction metal (shown at I') projecting from it and fitting into the countersunk depression in the cap. Upon the outer end of the stem is a hand-wheel or other device L, by which it may be turned.

Fixed to the stem, exterior to the cap, is a sleeve M, chambered on the inner end so as to fit over a corresponding projecting cylindrical portion of the screw-cap. A lug N projects from the sleeve, and is turnable with it and the stem, between the stops O O, fixed to the cap K. These lugs form stops to limit the movement of the lug N between them, and to show when the valve is opened or closed.

The operation will then be as follows: The valve which has a central projecting stem E², fitting in a corresponding hole in the valve-seat, is introduced so as to rest upon the seat, the stem serving as a guide to retain it in place. The cap is then placed upon the end of the valve-chamber, the valve-stem being pushed inwardly, so that the key enters between the lugs upon the back of the valve. The cap is then screwed into place and the valve is ready for operation. The openings through the valve are upon opposite sides of the projecting lugs, and when the lugs stand in line with the admission of exit-passages these openings are closed against the seat of the valve and do not coincide with the openings in the seat. By turning the valve-stem a quarter-revolution, the openings are brought into line with those in the seat, and thus form a communication between the inlet and exit passages of the case. The pressure of the medium which is transmitted through this valve, acting between the back of the valve E and the disk I, tends to force them apart, each being forced against its own seat, and a leakage around the valve is thus prevented upon one side, while upon the other side the disk E forms a close joint upon its seat around the valve-stem, thus making it unnecessary to employ any of the usual forms of packing at this point.

By reason of the lugs upon the valve and the key upon the valve-stem, it will be seen that a loose connection is made which allows the disks E and I to be separated sufficiently to maintain the respective joints, while the depth of the lugs and the key will prevent their being disengaged by any motion which may take place within the valve-case.

Having thus described my invention, what I claim as new, and desire to secure by Letters Patent, is—

1. A cylindrical valve-case having inlet and outlet openings and an intermediate valve seat, a valve recessed inside of its periphery, a separate and renewable face secured in said recess and being of smaller diameter than the exterior disk to form a circumscribing space whereby the transmitted medium exercises a pressure upon both sides of and partially balances the valve, and means whereby the valve may be turned, said valve and seat having ports through them adapted to be moved into and out of alinement.

2. A cylindrical valve-case having inlet and exit openings and connections upon opposite sides of its periphery, a diaphragm within the case interposed between said openings having passages connecting the two and forming a valve-seat, a circular valve having a depression in its face, a face formed of antifriction metal cast into said depression and faced to fit the valve-seat, said face being of smaller diameter than the exterior disk whereby the transmitted medium exercises a pressure upon both sides of the valve, openings in the valve adapted to coincide with those of the valve-seat or to be turned away from them, transverse parallel bars projecting from the back of the valve, a valve-stem extending axially through the cap of the valve-case having a key upon its inner end which fits loosely between the bars upon the valve whereby the latter may be turned and the pressure of the transmitted medium allowed to act so as to retain it against the valve-seat and form a tight joint.

In witness whereof I have hereunto set my hand.

AUGUST W. R. BERR.

Witnesses:
S. H. NOURSE,
JESSIE C. BRODIE.